Nov. 24, 1970   J. G. GARRISON   3,541,722
TRAP FOR MINNOW BUCKET OR THE LIKE
Filed March 24, 1969   2 Sheets-Sheet 1

INVENTOR.
JAMES G. GARRISON

BY  *Frank C. Leach jr.*

ATTORNEY.

Nov. 24, 1970          J. G. GARRISON          3,541,722
TRAP FOR MINNOW BUCKET OR THE LIKE
Filed March 24, 1969                         2 Sheets-Sheet 2

United States Patent Office 3,541,722
Patented Nov. 24, 1970

3,541,722
TRAP FOR MINNOW BUCKET OR THE LIKE
James G. Garrison, Manchester, Ky.
(Rte. 1, Box 125, Monticello, Ky. 43633)
Filed Mar. 24, 1969, Ser. No. 809,608
Int. Cl. A01k *69/06, 97/04*
U.S. Cl. 43—66        10 Claims

ABSTRACT OF THE DISCLOSURE

A trap is disposed in a minnow bucket or the like, which has minnows therein, for trapping one or more minnows within a passage in a body, which forms the trap. The body has a funnel on one end to direct the minnows into an entrance of the body. The entrance has means to prevent the minnows from escaping therethrough after they have entered the passage in the body. The other end of the passage in the body functions as an exit, which is substantially closed by a pair of pivotally mounted members. The opening between the pivotally mounted members is smaller than the size of a minnow but is sufficient to permit a head of a minnow to protrude therefrom for baiting on a hook. After a hook has been inserted into the head of the minnow, the cooperating members are pivoted away from each other to permit removal of one minnow from the passage in the body.

---

In baiting a fishing hook with a minnow, the normal procedure has been to reach into a minnow bucket or the like and grasp one of the minnows therein in the hand of the person baiting the fishing hook. Then, while holding the minnow in one hand, the fishing hook is inserted into the minnow with the other hand.

This procedure has certain disadvantages. First, the fisherman must insert his hand into the water within the minnow bucket and then located one of the minnows. Since the minnows are constantly swimming, this is not as easy task.

Furthermore, whenever the weather is cold, the immersion of the fisherman's hand into the water is not a pleasant experience. If the fisherman should attempt to use a glove or the like to prevent his hand from being subjected to the cold water, the fisherman loses his feel for locating the minnows because of the glove.

Additionally, the minnows tend to be most active. Therefore, the fisherman may grasp the minnow too tightly and bruise or kill it. If the minnow should be bruised, the minnow will die shortly after it is placed on the hook so that the minnow is not a satisfactory bait as it does not have the desired swimming action.

Because the minnow is very active, the minnow can easily escape from the hand of the fisherman when he is attempting to insert the fishing hook into the minnow. Thus, the minnow can fall outside of the boat and be lost or fall within the boat. If the fisherman is fishing at night, the minnow is as effectively lost when it falls within the boat as when it falls outside of the boat.

Since the minnow is very active, it is not easy for the fisherman to insert a fishing hook into the minnow even when the fisherman has grasped the minnow without bruising or killing it. Thus, this insertion of the fishing hook into the minnow takes a period of time whereby the opportunity for the minnow to escape from the fisherman's grasp increases.

The present invention satisfactorily overcomes the foregoing problems by providing a trap that is adapted to be disposed within a minnow bucket or the like to trap one or more minnows therein from the minnow bucket. Thus, it is not necessary for the fisherman to place his hands within the water since the trap may be raised from the minnow bucket and returned thereto by means of a string or the like attached to the trap. Therefore, the present invention permits a fisherman to use minnows as bait without having to immerse his hands in the minnow bucket.

The body of the trap of the present invention is arranged to insure that only one of the minnows within the body is disposed at an opening to have a fishing hook inserted therein. In the present invention, one of the minnows is retained in the position in which a fishing hook may be easily inserted into the minnow by the fisherman. Thus, there is no possibility of the minnow being either bruised due to handling by the fisherman when inserting the fishing hook into the minnow or by the minnow slipping from the grasp of the hand of the fisherman.

Furthermore, only a few seconds is required for a fisherman to insert the hook into the minnow. This permits a fisherman to have a bait ready much quicker.

Accordingly, the present invention insures that each minnow may be positively secured on a fishing hook before the minnow is released from the trap. Therefore, no minnows will be lost and none will be bruised.

The present invention also contemplates utilizing a funnel or the like to direct minnows from the minnow bucket into the trap of the present invention. Thus, the trap of the present invention is designed so that minnows will readily enter the trap from the minnow bucket. For example, the funnel could be designed to look like a natural hiding place such as a leaf.

An object of this invention is to provide a device for trapping a minnow or the like from a minnow bucket or the like for baiting.

Another object of this invention is to provide a device for trapping minnows from a minnow bucket in which no handling of the minnows by the fisherman occurs.

Other objects of this invention will be readily perceived from the following description, claims, and drawings.

This invention relates to a trap for use in a container or the like having minnows or the like therein. The trap includes a body having an entrance and an exit with a passage connecting the entrance and the exit. The trap has means to allow a minnow or the like to enter the passage through the entrance but preventing the minnow from escaping from the passage in the body through the entrance. The trap also has means to substantially close the exit to prevent the escape of any minnows in the body therefrom with the closing means having an opening therein of a smaller size than a minnow to permit a portion of a minnow to protrude therefrom. The closing means includes means to allow removal from the body of the minnow protruding through the opening.

The attached drawings illustrate preferred embodiments of the invention, in which.

Figure 1:
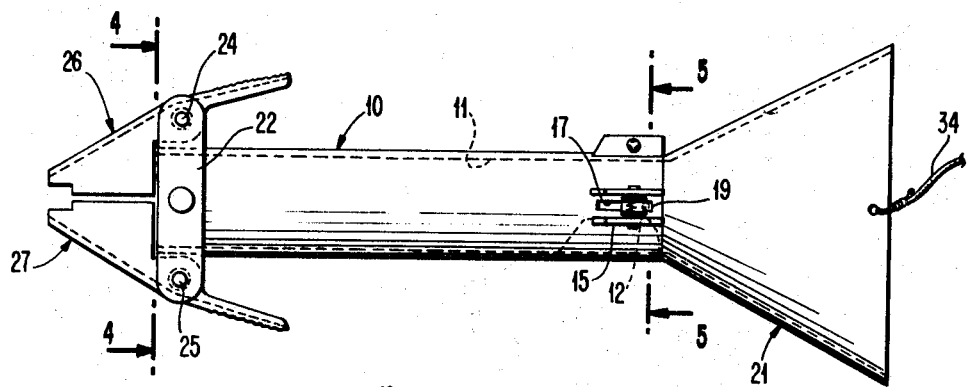
FIG. 1 is a side elevational view of one form of the trap of the present invention.

Referring to the drawings and particularly FIGS. 1–5, there is shown a trap for use in a minnow bucket or the like in which minnows are contained. The trap includes a body 10, which is shown as a hollow cylindrical member having a passage 11 extending therethrough. The passage 11 is shown as circular in cross section and preferably has a diameter less than the length of the smallest minnow so that the minnow can not turn around in the passage 11 after it has entered the passage 11.

Figure 5:
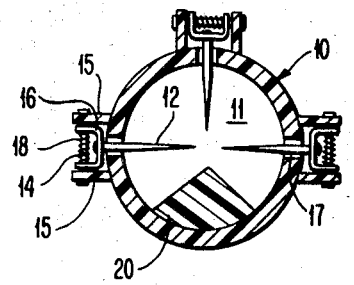
FIG. 5 is a sectional view taken along line 5—5 of FIG. 1 and showing the arrangement for preventing the minnows from escaping from the body of the trap through the entrance.
Figure 6:
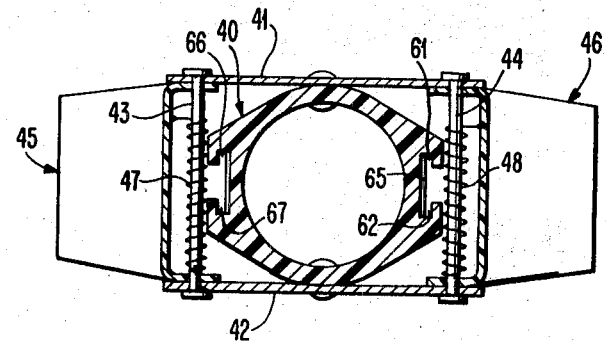
FIG. 6 is a sectional view of a body of another embodiment of the trap of the present invention.
Figure 7:
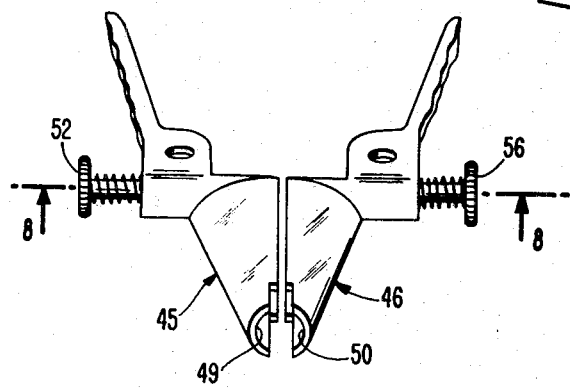
FIG. 7 is a perspective view of the cooperating members within which the minnow is disposed for baiting and used with the embodiment of FIG. 6.

One end of the body 10, which is preferably formed of plastic, has an entrance to allow minnows to enter the passage 11 while its other end has an exit to allow minnows to leave the passage 11 in the body 10. As shown in FIG. 5, a plurality of pins 12 is disposed across the entrance to reduce the open space of the entrance to less than the cross section of one of the minnows.

Each of the pins 12 is pivotally mounted on a rod 14. Each of the rods 14 is supported between raised legs or ears 15 on the body 10. Each of the pins 12 is supported on the rod 14 by a U-saped portion 16.

The body 10, which is formed with openings (not shown) to permit water to drain therefrom when the trap is lifted from the bucket, has longitudinal slots 17 formed therein adjacent the entrance with each of the slots 17 receiving one of the pins 12. Each of the pins 12 is resiliently urged towards the position in which it blocks the passage 11 in the body 10 in the manner shown in FIG. 5 by a spring 18, which is wrapped around the rod 14 and acts on the U-shaped portion 16 of the pin 12. The spring 18 urges the pin 12 against an edge 19 (see FIG. 1) of the s lot 17.

When one of the minnows enters the trap, the pins 12 are pivoted inwardly against the force of the springs 18 sufficiently to allow the minnow to enter the passage 11 in the body 10. If the minnow should attempt to escape through the entrance, the pins 12 will not pivot because they engage against the edges 19 of the slots 17.

As shown in FIG. 5, only three of the pins 12 have been employed. The lower portion of the entrance to the passage 11 in the body 10 is blocked by a projection 20, which extends upwardly from the inner surface of the body 10 and is preferably formed separate from the body 10 but secured thereto. If desired, the projection 20 could be omitted, and another of the pivotally mounted pins 12 could be employed. However, the pins 12 would have to be arranged so that none of the ears 15 would be in the area of the body 10 that rests on the bottom of the minnow bucket.

The body 10 has a funnel 21, which is preferably formed of plastic, fixed thereto by any suitable means. The funnel 21 is designed so that it will attract the minnows, which are within the bucket in which the trap of the present invention is disposed, to the entrance of the body 10. As a result, the minnows enter the funnel 21 since this appears to be a safe haven and then pass into the passage 11 in the body 10.

After a minnow has passed the pins 12 at the entrance to the passage 11, it cannot escape therethrough. This is due to the edges 19 of the slots 17 preventing the pins 12 from being movable in the direction in which the minnows would attempt to escape through the entrance.

Figure 4:
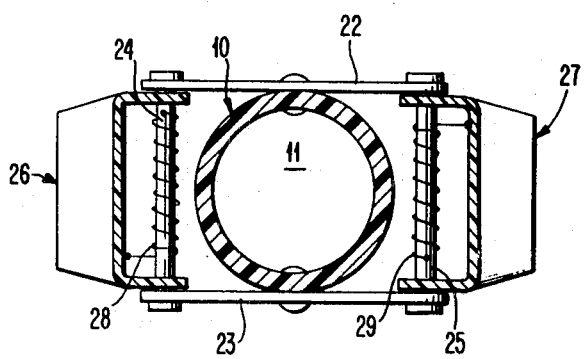
FIG. 4 is a sectional view taken along line 4—4 of FIG. 1 and showing the mounting arrangement for the cooperating members of FIG. 2.

The exit end of the body 10 has a pair of plates 22 and 23, which are preferably formed of metal, fixed thereto by rivets, for example, and disposed in parallel relation to each other. As shown in FIG. 4, a pair of pins 24 and 25 extends between the plates 22 and 23 and is fixed thereto. A member 26 is pivotally mounted on the pin 24 between the plates 22 and 23, and a member 27 is pivotally mounted on the pin 25 between the plates 22 and 23. A spring 28 continuously urges the member 26 to the position shown in FIGS. 1 and 2 while a spring 29 continuously urges the member 27 to the position shown in FIGS. 1 and 2.

Figure 2:
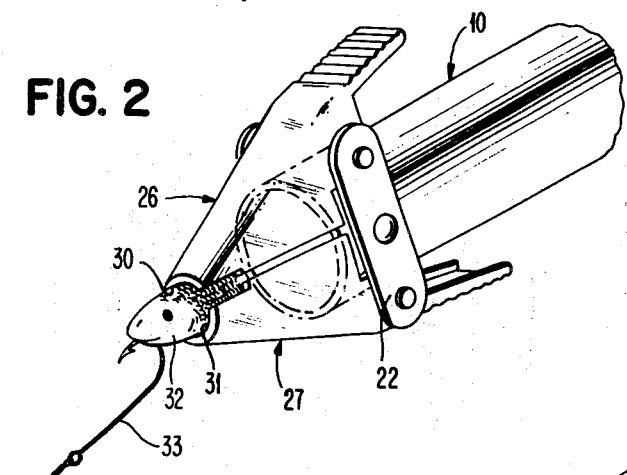
FIG. 2 is a perspective view of a portion of the trap of FIG. 1 with a minnow positioned with a fishing hook inserted therein.
Figure 3:
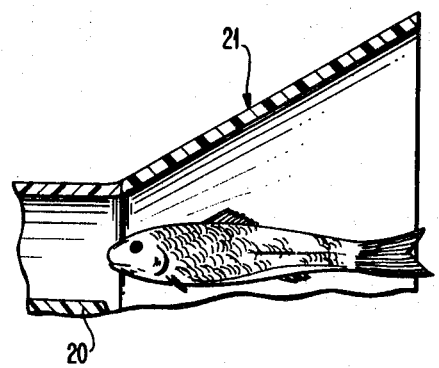
FIG. 3 is a sectional view of part of the funnel portion of the trap.

The member 26 has a cut out portion 30 cooperating with a cut out portion 31 in the member 27 to form an opening between the members 26 and 27. The opening is smaller than a minnow 32, which is to have a fishing hook 33 inserted therein as shown in FIG. 2.

By forming the members 26 and 27 of a transparent material such as a clear plastic, for example, the minnow 32 swims toward the members 26 and 27 because they appear to be an exit from the body 10. Thus, the minnow 32 readily swims toward the opening formed between the members 26 and 27.

Considering the operation of the present invention, the trap of the present invention is disposed within a minnow bucket or the like in which minnows are contained in water. One or more of the minnows enters the funnel 21 and passes into the passage 11 of the body 10 through the entrance opening. The minnows will cause the pins 12 to pivot against the force of the springs 18 to allow sufficient clearance to permit the minnows to enter the passage 11. The number of the minnows, which can be contained within the body 10, is determined by the length of the body 10 and the length of the minnows. Thus, the length of the body 10 is preferably such that two or three minnows of the usual length of about 1½" can be contained within the passage 11 in the body 10 with the minnows disposed lengthwise in the passage 11. A preferred length of the body 10 is four inches.

When it is desired to use one of the minnows as bait, the trap is removed from the minnow bucket by lifting a string 34, which is attached to the funnel 21. As a result, the body 10 is lifted from the minnow bucket with the funnel 21 at the upper end and the cooperating members 26 and 27 at the lower end. This results in one of the minnows being disposed within the opening between the members 26 and 27 in the manner shown in FIG. 2. With the body 10 held in the vertical position in which the members 26 and 27 are at the lower end, the fishing hook 33 is easily inserted into the head of the minnow 32 protruding through the opening defined by the cut out portions 30 and 31 of the members 26 and 27, respectively.

After the fishing hook 33 has been inserted into the head of the minnow 32, the members 26 and 27 are pivoted away from each other and against the force of the springs 28 and 29, respectively, by grasping the handle ends of the members 26 and 27. Thus, the member 26 pivots clockwise (as viewed in FIG. 1) while the member 27 pivots counterclockwise (as viewed in FIG. 1).

Before the minnow 32 is removed from the body 10 by pivoting the members 26 and 27, it is necessary to position the body 10 with the members 26 and 27 disposed so that another minnow can not escape therefrom. Otherwise, one or more of the other minnows within the passage 11 might escape from the body 10 when the members 26 and 27 are pivoted to allow removal of the minnow 32.

After the minnow 32 has been removed from the body 10, the members 26 and 27 are released, and the springs 28 and 29 return the members 26 and 27 to the position of FIGS. 1 and 2. Then, the trap is returned to the minnow bucket to permit another of the minnows to enter the passage 11. The trap remains in the minnow bucket until it is again desired to bait one of the fishing hooks 33.

Of course, if it should be desired to bait more than one of the fishing hooks 33 at the same time, it would only be necessary to allow the members 26 and 27 to return to their closed position and then again position the body 10 so that the members 26 and 27 are at the lower end. Another of the minnows would then have its head protrude through the openings between the members 26 and 27 to allow another of the fishing hooks 33 to be inserted therein.

If desired, the funnel 21 may have weights therein. These weights would insure that the body 10 lies flat on the bottom of the minnow bucket.

Referring to FIGS. 6-11, there is shown another form of the trap of the present invention. The trap includes a body 40, which is preferably formed of plastic, having the same type of entrance opening guard means and funnel as shown for the body 10.

The body 40 has a pair of substantially parallel plates 41 and 42, which are preferably metal, at its exit end with pins 43 and 44 entending therebetween. A member 45, which is similar to the member 26, is pivotally mounted on the pin 43, and a member 46, which is similar to the member 27, is pivotally mounted on the pin 44. A spring 47 continuously urges the member 45 toward the member 46, and a spring 48 continuously urges the member 46 toward the member 45.

The member 45 has a cut out portion 49 (see FIG. 7), and the member 46 has a cut out portion 50. The cut out portions 49 and 50 cooperate with each other to form an opening for a minnow to protrude therethrough in the same manner as described for the embodiment of FIGS. 1-5. The members 45 and 46 are preferably formed of a transparent material such as a clear plastic, for example, to attract the minnows toward the members 45 and 46 as previously mentioned with respect to the members 26 and 27.

Figure 8:
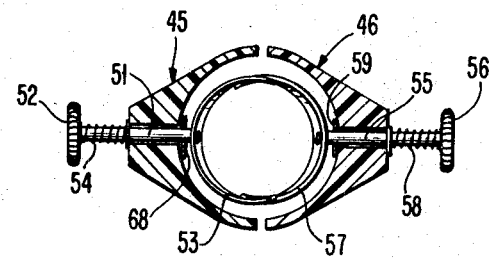
FIG. 8 is a sectional view of a portion of the structure of FIG. 7 and taken along line 8—8 of FIG. 7.
Figure 10:
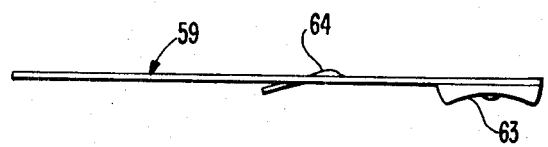
FIG. 10 is a top plain view of the connecting element of FIG. 9.

As shown in FIG. 8, the member 45 has a shaft 51 slidably mounted therein wilth a cap 52 secured to one end of the shaft 51. The other end of the shaft 51 is disposed inside the member 45 and has an arcuate member 53 fixed thereto. A spring 54 surrounds a portion of the shaft 51 and acts against the cap 52 to urge the shaft 51 to the left as viewed in FIG. 8. Thus, the arcuate member 53 is urged away from the center portion between the members 45 and 46 by the spring 54. The member 46 has a similar arrangement including a shaft 55, a cap 56, an arcuate member 57, and a spring 58.

A longitudinal member 59 (see FIG. 9) has a slot 60 formed in one end thereof to receive the shaft 55. The longitudinal member 59, which is preferably formed of metal, is slidably supported in a pair of grooves 61 and 62 (see FIG. 6), which are formed in the body 40.

The position of the member 59 is adjustable relative to the body 40 through grasping a handle or knob 63 on the longitudinal member 59. A spring 64, which cooperates with ridges 65 (see FIG. 6) in the body 40 between slots 61 and 62, retains the longitudinal member 59 in any position to which it is moved.

The body 40 has a similar pair of slots 66 and 67 on the opposite side from the slots 61 and 62 to accommodate a longitudinal member 68, which has the same configuration as the longitudinal member 59 and is preferably formed of metal. Thus, the longitudinal member 68 receives the shaft 51 within a slot and is adjustable relative to the body 40.

By moving the longitudinal members 59 and 68 relative to the body 40, the members 45 and 46 may be moved away from each other to accommodate minnows of larger size. Thus, as the longitudinal members 59 and 68 are moved outwardly from the body 40, the longitudinal members 59 and 68 engage the inclined surfaces of the members 45 and 46, respectively. This causes pivoting of the members 45 and 46 about the pins 43 and 44, respectively, to allow minnows of larger size to be accommodated. Withdrawal of the longitudinal members 59 and 68 from engagement with the inclined surfaces of the members 45 and 46 results in the springs 47 and 48 returning the members 45 and 46 into engagement with each other.

Figure 11:
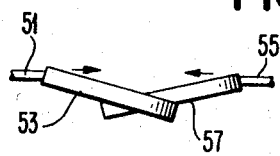
FIG. 11 is a schematic view of a portion of the structure of FIG. 8 showing the overlapping arrangement between which a minnow is retained.
Figure 9:
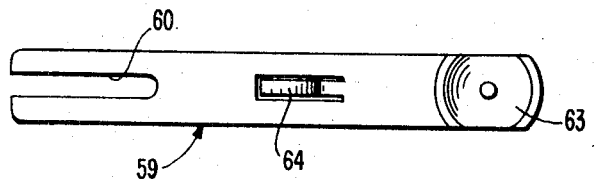
FIG. 9 is a side elevational view of a connecting element between the body of FIG. 6 and one of the cooperating members of FIG. 7.

By moving the arcuate members 53 and 57, which are preferably formed of metal, towards each other, they will overlap as shown in FIG. 11. As a result, the minnow is retained between the arcuate members 53 and 57 even when the body 40 is positioned with the cooperating members 45 and 46 at its upper end. Thus, this embodiment prevents the minnow from flopping when the fishing hook 33 is to be inserted therein and allows easier insertion of the fishing hook 33 into the minnow since the body 40 is positioned with the minnow at its upper end.

The overlapping arrangement of the arcuate members 53 and 57 also permits minnows of various sizes to be readily retained therebetween. Thus, the arcuate members 53 and 57 are effective irrespective of the adjusted positions of the members 45 and 46.

The operation of this embodiment is substantially the same as that described for the embodiment of FIGS. 1-5. One distinction is that the caps 52 and 56 are pushed toward each other to move the arcuate members 53 and 57 into an overlapping position, as shown in FIG. 11, in which they will retain the minnow therebetween even when the body 40 is positioned with the members 45 and 46 at its upper end. The other distinction is that the members 45 and 46 are adjustable relative to each other by the longitudinal members 59 and 68 to accommodate minnows of different sizes.

After the minnow has had the fishing hook 33 inserted therein, the members 45 and 46, which have been adjusted by the longitudinal members 59 and 68 in accordance with the size of the minnows, are pivoted away from each other to allow withdrawal of the minnow. Of course, the caps 52 and 56 must be released too.

Figure 12:
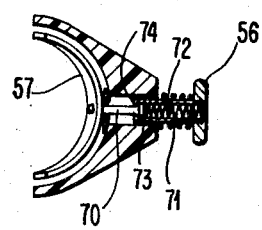
FIG. 12 is a sectional view showing a modification of a portion of the structure of FIG. 8.

While the shafts 51 and 55 have been shown as single members, it should be understood that each could be formed of a pair of telescoping members with a spring urging them apart. As shown in FIG. 12, the shaft 55 is replaced by telescoping members 70 and 71. The member 70 is fixed to the arcuate member 57, and the member 71 has the cap 56 connected thereto.

A spring 72 is disposed within the member 71 and acts between the cap 56 and a shoulder 73 on the member 70. The movement of the member 70 relative to the member 71 and the spring 72 is limited by the shoulder 73 engaging an annular flange 74 on the member 71. A similar arrangement is utilized in place of the shaft 51.

In this arrangement, the total force exerted on the caps 52 and 56 by the fisherman is not transmitted to the arcuate members 53 and 57. Instead, the spring 72 and a similar spring for the arcuate member 53 transmit only the force necessary to move the arcuate members 53 and 57 toward each other to grasp the minnow therebetween. These springs function to prevent the minnow from being gripped too tightly.

An advantage of this invention is that minnows can not slip from a fisherman's hand when he is attempting to place a minnow on a fishing hook. Another advantage of this invention is that there is no bruising of any minnow during insertion of a fishing hook into the minnow. A further advantage of this invention is that the hands of the fisherman will not be wet from attempting to insert a fishing hook into a minnow whereby the fisherman's hands are not exposed to water, especially during cold weather.

For purposes of exemplification, particular embodiments of the invention have been shown and described according to the best persent understanding thereof. However, it will be apparent that changes and modifications in the arrangement and construction of the parts thereof may be resorted to without departing from the spirit and scope of the invention.

I claim:
1. A trap for use in a container or the like having minnows or the like therein, said trap including:
a body having:
an entrance;
an exit;
and a passage connecting said entrance and said exit;
means to allow a minnow or the like to enter said passage through said entrance but preventing the minnow from escaping from said passage in said body through said entrance;
means to substantially close said exit to prevent the escape of any minnows in said body therefrom;
said closing means having an opening therein of a smaller size than a minnow to permit a portion of a minnow to protrude therefrom,
and said closing means including means to permit removal from said body of the minnow protruding through said opening.

2. The trap according to claim 1 including means attached to said body for directing a minnow or the like into said entrance of said body.

3. The trap according to claim 1 including means to retain the minnow in said opening in said closing means.

4. The trap according to claim 1 in which:
said allowing means comprises:
a plurality of pivotally mounted pins cooperating with each other to block said entrance;
and resilient means urging said pins to the blocking position, said resilient means being overcome when a minnow enters said body through said entrance.

5. The trap according to claim 1 including means to adjust the size of said opening in said closing means in accordance with the size of the minnow.

6. The trap according to claim 1 in which:
said closing means includes:
a pair of members cooperating with each other to form said opening;
and means to mount said cooperating members on said body for movement away from each other to increase the size of said opening to allow removal from said body of the minnow protruding through said opening.

7. The trap according to claim 6 including means to adjust the positions of said cooperating members of said closing means in accordance with the size of the minnow to adjust the size of said opening in said closing means.

8. The trap according to claim 6 in which:
said mounting means includes:
means to pivotally mount each of said cooperating members on said body;
and means to urge said cooperating members toward each other to form said opening in said closing means.

9. The trap according to claim 8 including:
first means slidably mounted on said body and cooperating with one of said cooperating members;
second means slidably mounted on said body and cooperating with the other of said cooperating members;
means to retain each of said first and second means in any position to which each is moved;
and said first and second means being capable of moving said cooperating members away from each other to increase the size of said opening in said closing means to accommodate minnows of increased size.

10. The trap according to claim 9 including means to hold the minnow disposed in said opening in said closing means when said cooperating members are moved away from each other.

References Cited
UNITED STATES PATENTS

| | | | |
|---|---|---|---|
| 504,526 | 9/1893 | Hemp | 43—56 |
| 2,670,557 | 3/1954 | Pachner | 43—4 |
| 2,857,705 | 10/1958 | Woodcock | 43—55 |

WARNER H. CAMP, Primary Examiner

U.S. Cl. XR.

43—4, 56